United States Patent
Iyer et al.

(10) Patent No.: US 9,436,845 B2
(45) Date of Patent: Sep. 6, 2016

(54) PHYSICALLY UNCLONABLE FUSE USING A NOR TYPE MEMORY ARRAY

(71) Applicant: GLOBALFOUNDRIES U.S. 2 LLC, Hopewell Junction, NY (US)

(72) Inventors: Subramanian S. Iyer, Mount Kisco, NY (US); Toshiaki Kirihata, Poughkeepsie, NY (US); Chandrasekharan Kothandaraman, Hopewell Junction, NY (US); Derek H. Leu, Hopewell Junction, NY (US); Sami Rosenblatt, White Plains, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 151 days.

(21) Appl. No.: 14/224,099

(22) Filed: Mar. 25, 2014

(65) Prior Publication Data
US 2015/0278551 A1    Oct. 1, 2015

(51) Int. Cl.
| | |
|---|---|
| G06F 21/70 | (2013.01) |
| G11C 16/24 | (2006.01) |
| G11C 16/28 | (2006.01) |
| G11C 16/04 | (2006.01) |

(Continued)

(52) U.S. Cl.
CPC .............. *G06F 21/70* (2013.01); *G06F 21/44* (2013.01); *G06F 21/73* (2013.01); *G09C 1/00* (2013.01); *G11C 16/0466* (2013.01); *G11C 16/20* (2013.01); *G11C 16/22* (2013.01);

(Continued)

(58) Field of Classification Search
CPC ........ G06F 21/44; G06F 21/70; G06F 21/73; G11C 16/04; G11C 16/24; G11C 16/28; G11C 16/0466; G11C 17/08; G11C 17/12; G11C 7/00; G11C 11/409; G11C 11/4091; G11C 7/06; G11C 16/0483; G11C 29/50; G11C 8/16; G11C 11/4099; G11C 11/405; H01L 27/112
USPC ................. 726/2, 16, 34; 365/185.1, 185.18, 365/189.09, 201, 207, 189.07

See application file for complete search history.

(56) References Cited

U.S. PATENT DOCUMENTS

| | | | | |
|---|---|---|---|---|
| 4,855,956 | A | * | 8/1989 | Urai ....................... G11C 17/12 257/E27.081 |
| 5,101,380 | A | * | 3/1992 | Yasuda ................. H01L 27/112 257/E27.102 |

(Continued)

OTHER PUBLICATIONS

"Physical Unclonable Functions for Device Authentication and Secret Key Generation", G. Edward Suh, et al., DAC 2007, Jun. 4-8, 2007, San Diego, CA.

(Continued)

*Primary Examiner* — Thanhnga B Truong
(74) *Attorney, Agent, or Firm* — Yuanmin Cai; Hoffman Warnick LLC (57) ABSTRACT

A method for identifying an unclonable chip uses hardware intrinsic keys and authentication responses employing intrinsic parameters of memory cells invariant and unique to the unclonable chip, wherein intrinsic parameters that characterize the chip can extend over its lifetime. The memory cells having a charge-trap behavior are arranged in an NOR type memory array, allowing to create a physically unclonable fuse (PUF) generation using non-programmed memory cells, while stringing non-volatile bits in programmed memory cells. The non-volatile memory cell bits are used for error-correction-code (ECC) for the generated PUF. The invention can further include a public identification using non-volatile bits, allowing hand shaking authentication using computer with dynamic challenge.

7 Claims, 11 Drawing Sheets

(51) Int. Cl.
   *G06F 21/73*       (2013.01)
   *G06F 21/44*       (2013.01)
   *G09C 1/00*        (2006.01)
   *G11C 16/20*       (2006.01)
   *G11C 16/22*       (2006.01)
   *H04L 9/32*        (2006.01)
   *H04L 9/08*        (2006.01)

(52) U.S. Cl.
   CPC .............. *G11C 16/24* (2013.01); *G11C 16/28* (2013.01); *G06F 2221/2103* (2013.01); *H04L 9/0866* (2013.01); *H04L 9/3278* (2013.01)

(56) References Cited

U.S. PATENT DOCUMENTS

| | | | | |
|---|---|---|---|---|
| 5,400,280 A | * | 3/1995 | Yamauchi | G11C 16/0483 365/185.14 |
| 5,926,428 A | * | 7/1999 | Rao | G11C 7/06 365/205 |
| 6,990,025 B2 | * | 1/2006 | Kirihata | G11C 8/16 365/189.04 |
| 8,203,869 B2 | * | 6/2012 | Jung | G11C 7/02 365/100 |
| 8,590,010 B2 | | 11/2013 | Fainstein et al. | |
| 2015/0101037 A1 | * | 4/2015 | Yang | G06F 21/44 726/16 |

OTHER PUBLICATIONS

"Improved Circuits for Microchip Identification Using SRAM Mismatch", Srivatsan Chellappa, et al., 2011, IEEE.

"Field Tolerant Dynamic Intrinsic Chip ID Using 32 nm High-K Metal Gate SOI Embedded DRAM", Sami Rosenblatt, et al., 2013 IEEE.

* cited by examiner

| Mode | WL | BL | SL |
|---|---|---|---|
| Standby | GND (0V) | VDD (1V) | VDD (1V) |
| ECC Program | EWLH (2V) | GND (0V) | EBLH (1.5V) |
| PUF GEN | VDD (1V) | *VDD – VT | VDD (1V) |
| ECC Reset | NWLL (–1V) | VDD (1V) | VDD (1V) |

PHYSICALLY UNCLONABLE FUSE USING A NOR TYPE MEMORY ARRAY

FIELD OF THE INVENTION

The present invention relates to chip identification using hardware intrinsic keys and authentication responses, and methods and circuits required to generate a unique identifying string to identify the chip.

BACKGROUND AND RELATED ART

The reliably of self-identifying chips have become a necessity in contemporary security and encryption applications. It is known in the art that there is a need for a secret key storage in the semiconductor industry, and further, wherein the cost is the top barrier that must be addressed to increase the adoption of the secret key storage and hardware intrinsic security. In addition, a unique identification of a specific device is a dominant reason given by survey participants for adopting secret key storage.

According, and particularly for fabless semiconductor design companies, there is a critical need in industry for a cost-effective solution to internal and external IC clients that provides chip authentication and identification with minimal design and area overhead. The solution requires a minimum amount of additional circuitry or mask levels on the chip, and sufficiently simple that they do not impact the yield, and it being adaptable to a broad range of products.

Process variations in a VLSI chip can originate unique electrical fingerprints, and these constitute a secure approach to chip security known as Physically Unclonable Functions (PUFs).

Several methodologies, mechanisms, and systems can be employed to allow intrinsic features of a computer chip or integrated circuit (IC) to be used to generate one or more unique and difficult to replicate IDs corresponding to the chip or IC. In one implementation for determining a unique intrinsic ID of a chip is described in U.S. Patent Application 2013/0133031 A1, titled "Retention Based Intrinsic Fingerprint Identification Featuring A Fuzzy Algorithm And A Dynamic Key" by Fainstein et al., published Can 23, 2013, of common assignee, is incorporated herein by reference in its entirety.

An additional implementation of determining a unique intrinsic ID of a chip is described in "Field Tolerant Dynamic Intrinsic Chip ID Using 32 nm High-K/Metal Gate SOI Embedded DRAM" by Rosenblatt et al., published in the IEEE Journal of Solid-State Circuits, Vol. 48, No. 4, April 2013, of common assignee, is incorporated herein by reference in its entirety.

A further implementation of determining a unique intrinsic ID of a chip is described in "Improved Circuits for Microchip Identification using SRAM Mismatch" by Chellappa, et al., Custom Integrated Circuits Conference (CICC), 2011 IEEE, of common assignee, is incorporated herein by reference in its entirety.

A further implementation of determining a unique intrinsic ID of a chip is described in "Physical Unclonable Functions for Device Authentication and Secret Key Generation" by Suh et al., Proceedings of the 44th Annual Design Automation Conference (ACM), 2007, of common assignee, is incorporated herein by reference in its entirety.

The challenges for a PUF based ID approaches reside in providing the intrinsic ID function to generate the PUF ID with minimum chip overhead while giving stable generation.

SUMMARY

Accordingly, in an embodiment of the invention, a method and a system are described for providing VLSI chips and a system that generates an unclonable intrinsic identification using a NOR type memory array to achieve ID security and high accuracy of authentication.

In another embodiment, a system and a method are provided for identifying a chip that employs intrinsic parameters of memory cells invariant and unique to the chip over its lifetime.

In still another embodiment, a chip is uniquely identifies by using a random bitmap pattern on a plurality of memory cells, each having transistors in a memory array. A low-cost solution is provided that is compared to a 6 conventional transistors SRAM based PUF and a DRAM based PUF that provides a simpler solution than the SRAM and DRAM based PUFs for generating a random bit pattern.

In a further embodiment, a charge trap memory having each a transistor, wherein a random bit pattern is generated by using a non-charge-trapped transistor in said charge trap memory array.

In yet a further embodiment, the chip uniquely identifies a chip by using a random bitmap pattern using a plurality of the memory cells, each having a pair of transistors in a memory array. The method provides a further simpler solution than the SRAM and DRAM based PUFs for generating a random bit pattern.

In still another embodiment, a charge trap memory is used, each having a pair of transistors, wherein a random bit pattern is generated by using a pair of the non-charge-trapped transistors in said charge trap memory.

In a further embodiment, a charge trap memory array includes a plurality of memory cells, wherein said memory cells are assigned for PUF bit generation using a non-charge-trap memory cell and error correction non-volatile bit storage using charge-trap memory cell in said charge trap memory array such that the generated PUF bits are corrected by error correction non-volatile bits, resulting in a stable PUF generation.

In still a further embodiment, a charge trap memory array includes a plurality of memory cells, wherein said memory cells are assigned to a PUF bit generation using a non-charge-trap memory cell and public ID bits using a charge-trap memory cell in said charge trap memory array. The method provides a dynamic PUF generation for secure authentication by chip and system handshaking steps, wherein (1) the system requests a public ID to the corresponding chip, (2) the chip responds to the public ID to the system, (3) the system challenges the chip using the public ID, (4) the chip generates and sends the PUF using the challenge, and (5) system authenticates whether the generated PUF is same as the system record.

In yet a further embodiment, a method provides an unclonable identifying chip that includes forming a memory array consisting of memory cells arranged in a matrix, each of the memory cells having one transistor, wherein the transistors in each row are coupled to a wordline, and the transistors in each column are coupled to a bitline and to a source line; activating the wordline and forcing a bitline voltage to a first voltage, floating the bitline followed by precharging the bitline through the transistor coupling to the activated wordline, and sensing the bitline voltage, wherein random binary strings are generated by sensing results of the bitline voltage.

BRIEF DESCRIPTION OF THE DRAWINGS

The present invention will be understood and appreciated more fully from the following detailed description of the invention, taken in conjunction with the accompanying drawings of which.

DETAILED DESCRIPTION

Detailed embodiments of the present invention are disclosed herein. However, it is to be understood that the disclosed embodiments are merely illustrative of the invention that can be embodied in various forms. In addition, each of the examples given in connection with the various embodiments of the invention is intended to be illustrative, and not restrictive.

Figure 1:
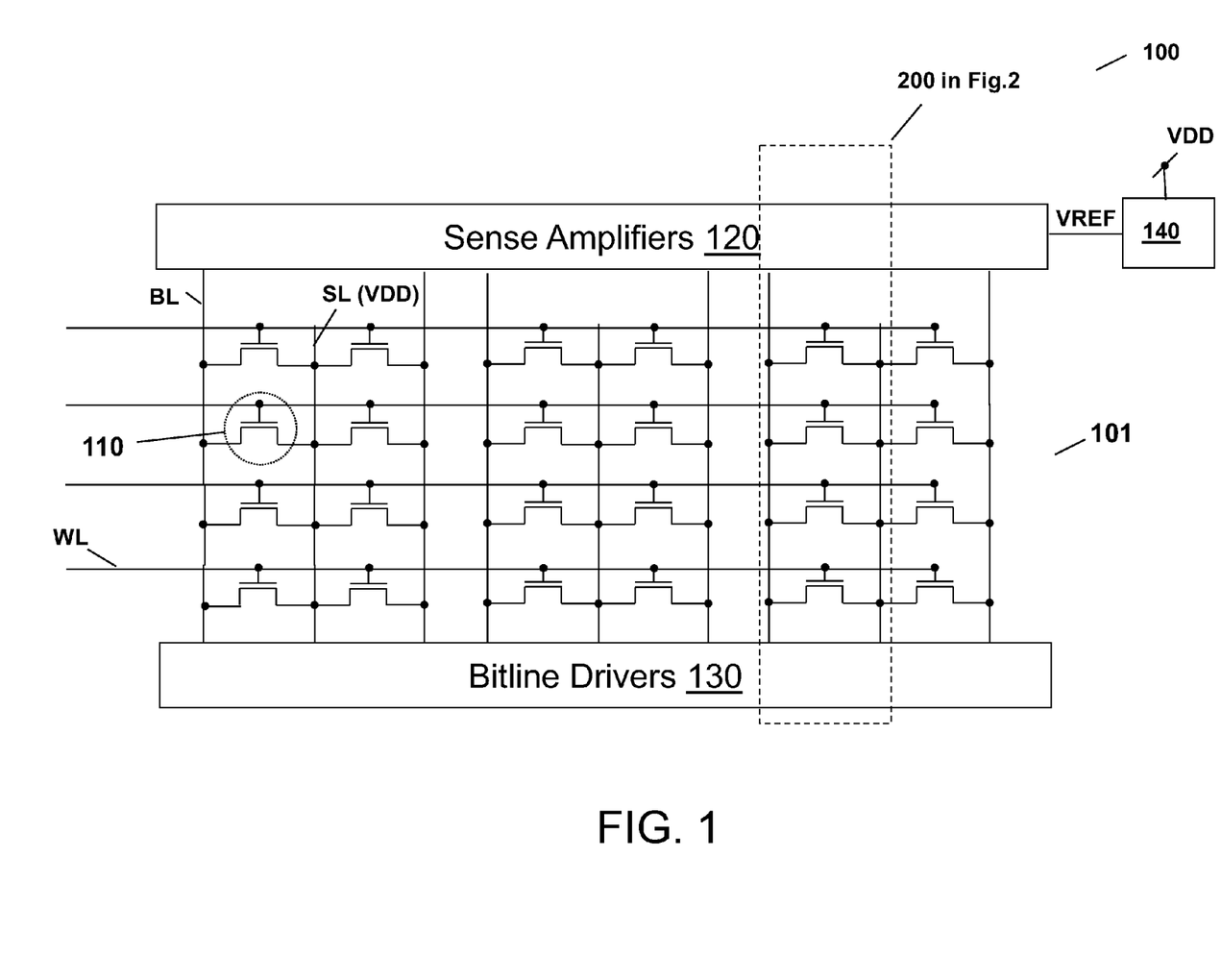
FIG. 1 shows a schematic diagram of a NOR type memory array having a single transistor per bit for generating a random bit pattern as PUF.

FIG. 1 shows an embodiment illustrating a transistor level schematic for a PUF bit generation core (100). Array (101) consists of a plurality of NMOS devices (110) arranged in a two dimensional matrix. The gate of the NMOSs (110) in a row is coupled to wordline (WL) running in the horizontal direction. The drain of NMOSs (110) in a column is coupled to the corresponding bitline (BL) running in a vertical direction. The source of all the NMOSs is coupled to a source-line (SL). SL is biased at a voltage supply (VDD). The array structure (100) results in a NOR type array having the NMOS parallel connection to the BL in each column. The NMOSs in the NOR type array is controlled by a wordline driver (not shown), bitline drivers (130), and sense amplifiers (120). The sense amplifiers (120) are coupled to BLs, and a reference voltage (VREF) generated by a reference voltage generator (140) for generating a random bit pattern.

Figure 2:
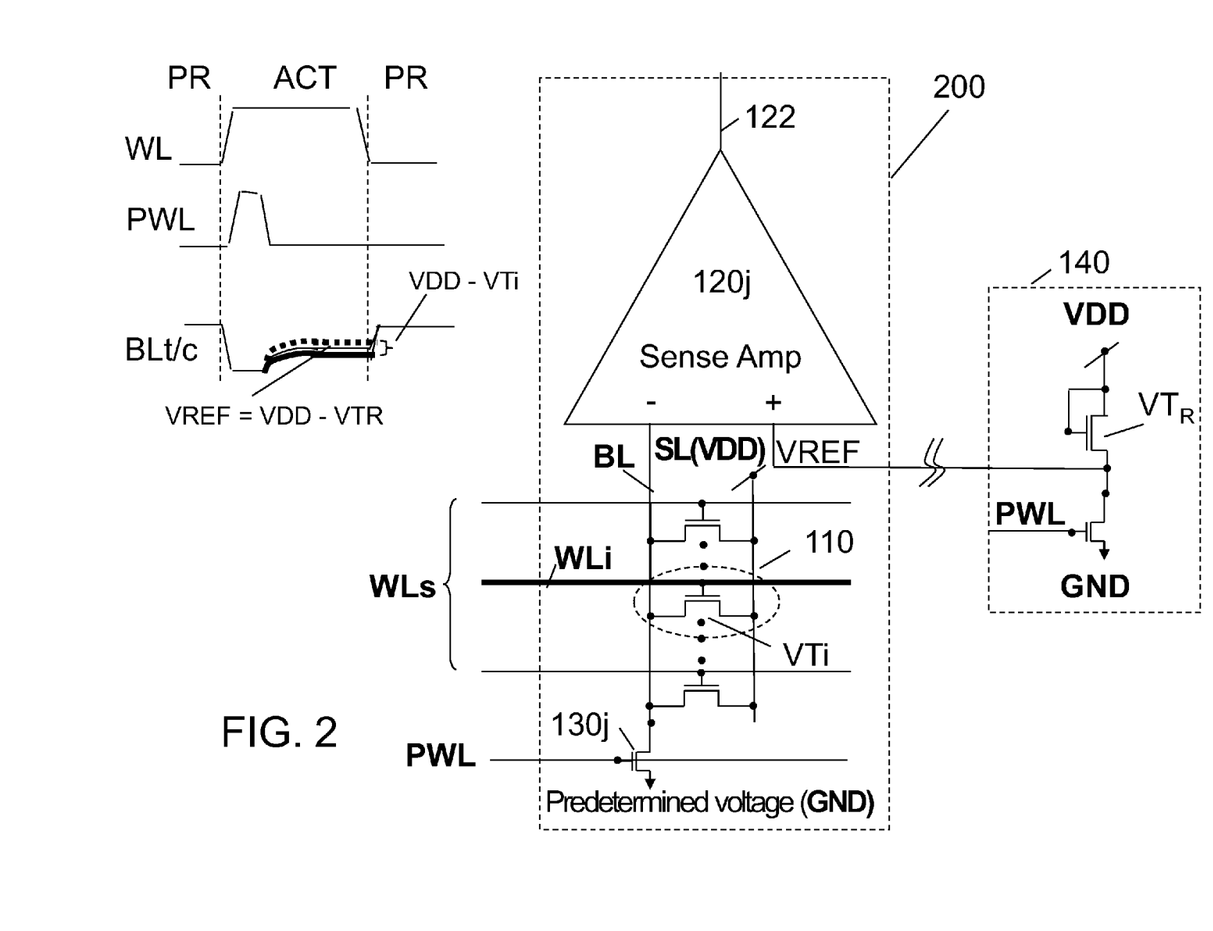
FIG. 2 shows a detailed schematic and a timing diagram of the NOR type array in one column shown in FIG. 1, wherein a sense amplifier compares the BL voltage to a reference voltage for generating a random bit pattern due to intrinsic distribution of the cell threshold voltage (VT).

FIG. 2 shows a detailed circuit and a timing diagram for column (200) in FIG. 1. Sense amplifier (120j) is coupled to BL and VREF voltage. BL is precharged at VDD in precharged state (PR) prior to the PUF generation. The source line SL is precharged to VDD. The PUF generation (active state: ACT) starts by disabling the precharging operation, and activates the corresponding WL selected by the address similar to a conventional memory. A signal pulsed WL (PWL) is likewise also activated. When WL and PWL are raised to VDD, one of the NMOS in each column discharges the BL to a pre-determined voltage (lower than VDD) preferably GROUND (GND), or 0V. The signal PWL then goes low, disabling the BL driver (130j), and floating BL. Thus, it naturally charges the BL through the selected NMOS (110) by a corresponding activated WL (WLi). As BL goes high because of the source follower mode of the NMOS device operation, the gate overdrive to WL and to BL is reduced, and eventually disables the NMOS (110), shown in the timing diagram, resulting in generating a VDD minus NMOS device threshold voltage (VTi) on the BL. The reference voltage generator (140) uses the same device employed for the NMOS memory cell to generate the reference voltage (VREF) of $VDD-VT_R$. Because of the intrinsic distribution of the NMOS VTs (VTi and $VT_R$), the generated BL voltage (=VDD-VTi) and (VREF=VDD-$VT_R$) depends on the intrinsic VT in the hardware. The differential voltage (VTi-$VT_R$) of BL and REF is preferably sensed by a differential sense amplifier (120j). This results in a random digital bit generation (high or low) as an output (122) of the sense amplifier (120j). Following the generation, the WL goes low, and BL is precharged to VDD, returning to a precharge state (PR).

In a first preferred embodiment, it allows to generate one random bit per transistor. However, relaying on the reference voltage (VREF) can cause a random bit pattern skew to 0 or to 1 if $VT_R$ of the VREF generator has a significant offset from the mean of the NMOS VT distribution. For example, if VREF is too low due to the high $VT_R$ of the VREF generator, the generated bit is more likely a 0 (skewing to 0).

Figure 3:
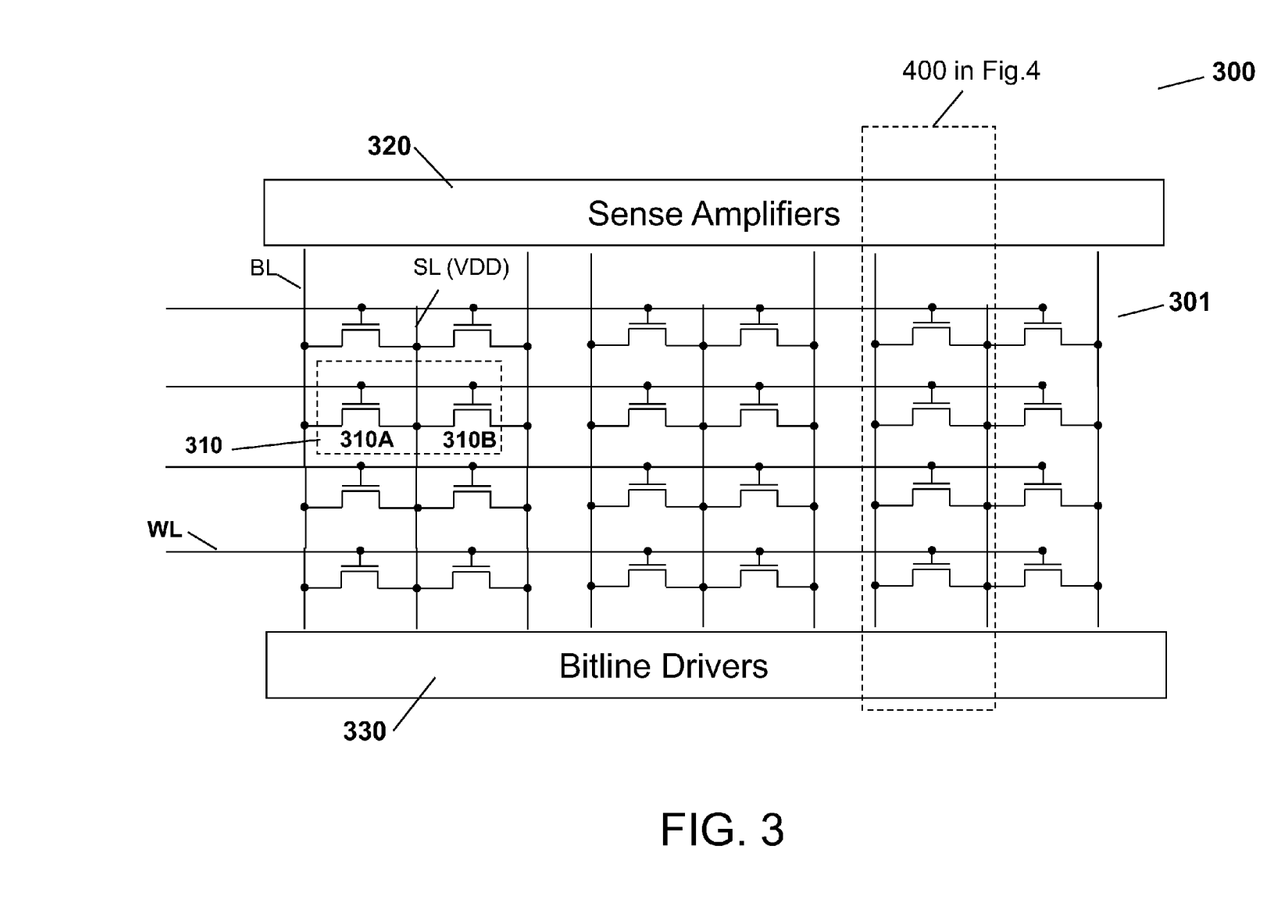
FIG. 3 shows a schematic diagram of a NOR type memory array having a pair of two transistors for generating a random bit pattern as PUF.

FIG. 3 shows a second preferred embodiment illustrating a transistor level schematic for a PUF bit generation core (300). The array (301) consists of a plurality of memory cells (310), each having two transistors (310A and 310B) to overcome the skewing problem. The array structure (301) coincides with the array (101 of FIG. 1) but at one-half density of the array (102) because of the two transistor assignments per cell. These are supported by wordline drivers (not shown) coupling to the wordlines (WLs), and sense amplifiers (320), bitline drivers (330) coupling to bitlines (BLs). Unlike the first approach, a random bit is generated by an intrinsic VT distribution of the pair (310A and 310B) of a cell (310).

Figure 4:
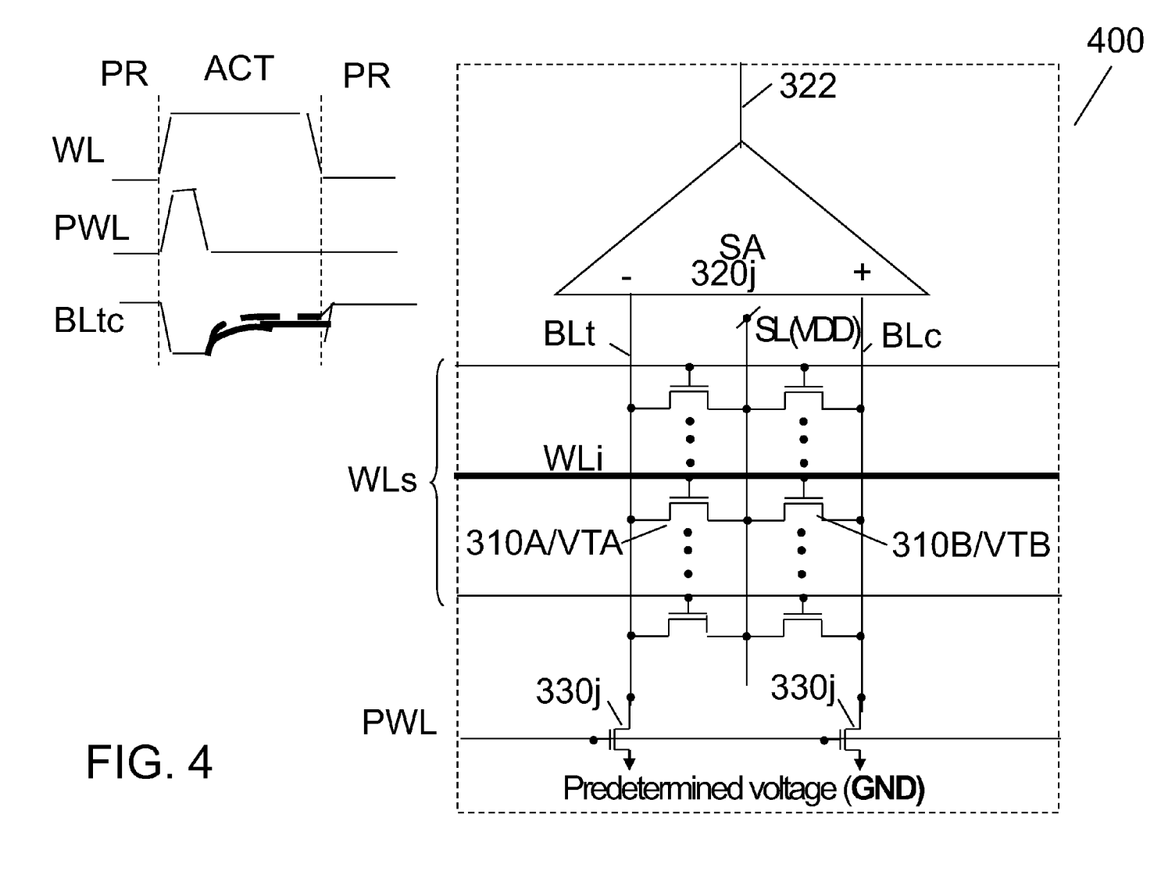
FIG. 4 shows a detailed schematic and timing diagram of the NOR type array in one column seen in FIG. 3, wherein a sense amplifier compares the pair of BL voltages that generates a random bit pattern due to intrinsic distribution of the threshold voltage (VT) of the pair of cells.

FIG. 4 shows a detailed circuit and timing diagram of one column (400 in FIG. 3). The Sense amplifier (320j) is coupled to a bitline true (BLt) and to a bitline complement (BLc), each coupling to the cells (310A) and (320B) in a column. Both BLt and BLc are precharged to VDD in a precharged state (PR) prior to the PUF generation. The source-line (SL) is likewise precharged to VDD. The PUF generation (active state: ACT) starts by disabling the BL precharge operation, and activating the corresponding WL selected by an address similar to a conventional memory. A signal that pulses WL (PWL) is also activated. When WL and PWL are raised to VDD, the selected NMOS pair in each column discharges BL to a predetermined voltage (i.e., lower than VDD), and preferably to GND, or 0V. The signal PWL then goes low, disabling the BL driver transistors (330j), and floating BLt and BLc. Thus, it naturally charges BLt and BLc through the selected NMOS pair (310A and 310B) by the corresponding activated WL (WLi). As BLt and BLc go high because of the source follower mode of the NMOS device operation (310A and 310B), the gate overdrive to WL to BLt and to BLc are reduced, eventually disabling the NMOS, as shown in the timing diagram. This results in having the voltage of VDD minus the NMOS device threshold voltage (VT) on each BLt and BLc. Because of the intrinsic distribution of the NMOS VTs (VTA for 310 NMOS and VTB for 310B NMOS), the BLt voltage (VDD−VTA) and BLc voltage (VDD−VTB) depends on a corresponding NMOS of the pair, which creates a differential voltage into the BL pair. The differential voltage is amplified by the differential sense amplifier (320j), resulting in a random digital bit generation as output (322) of the sense amplifier (320j). After the generation, WL goes low, and BLt and BLc are precharged to VDD, returning to a precharge state (PR).

Figure 5:
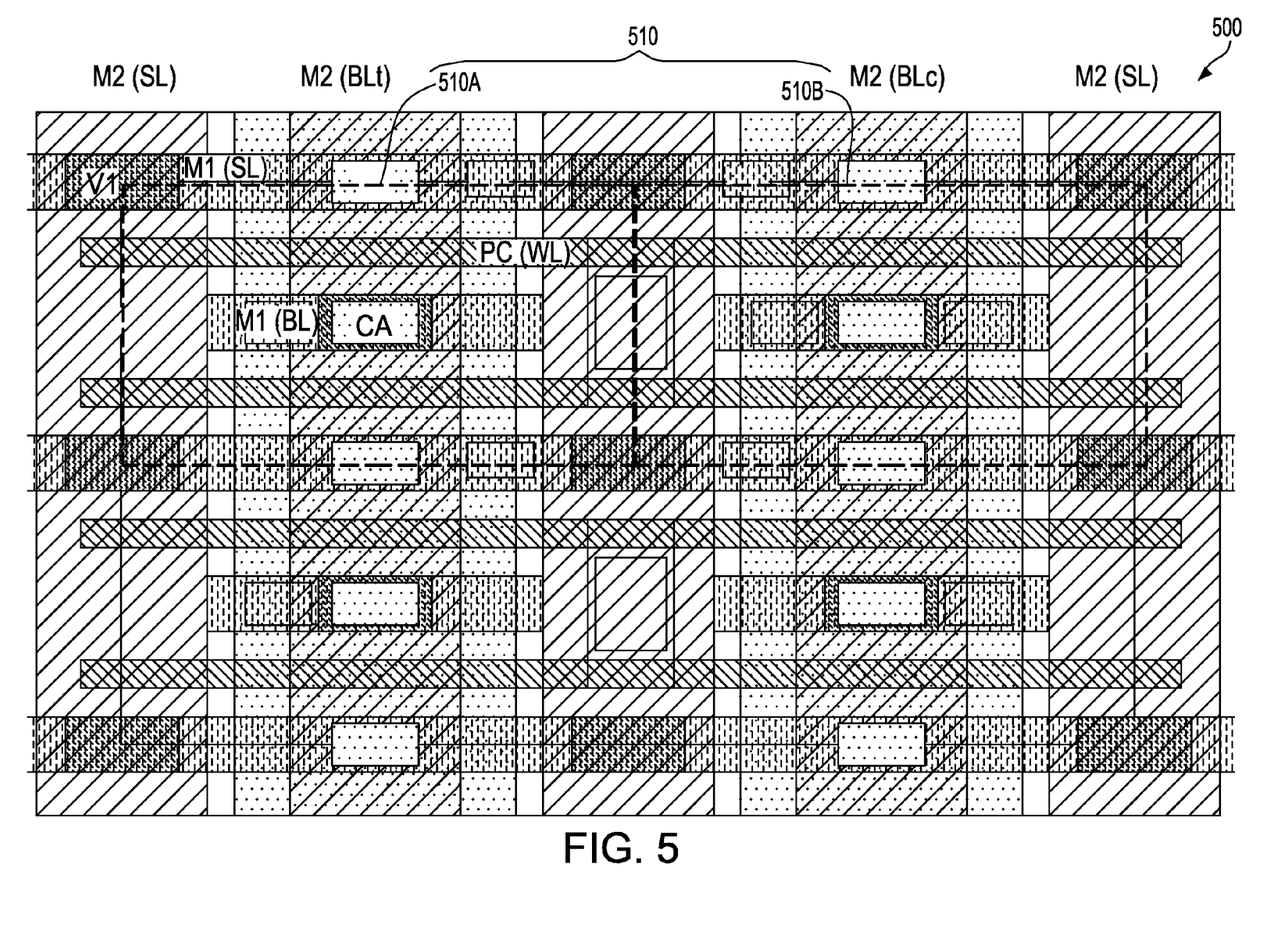
FIG. 5 shows the mask layout of the NOR type memory array.

FIG. 5 shows the mask layout of a NOR type memory array (500 or 301 in FIG. 3) having a plurality of memory cells (510), each having a NMOS pair (510A and 510B pair is equal to 310A and 310B in FIG. 3), wherein the source line (SL) relies on the VDD voltage. The same array structure can be used for the first approach of the array (101) (shown in FIG. 1) having a plurality of NMOS (110 in FIG. 1), by assigning BLt and BLc to the independent BL. As shown in FIG. 3, wordlines (WL) run horizontally using poly (PC), with BLt and BLc pairs and VDD reaching SLs running vertically using M2. SLs can likewise run horizontally, creating a mesh structure. By way of example, two wordlines are used for activating two finger devices as a WL, although one PC can be used for one WL.

The NOR type array referred to in the first and second embodiments can be used for creating a charge trap memory by trapping the change to the NMOS memory cell (110) in FIG. 1, or 310 in FIG. 3.

Figure 6:
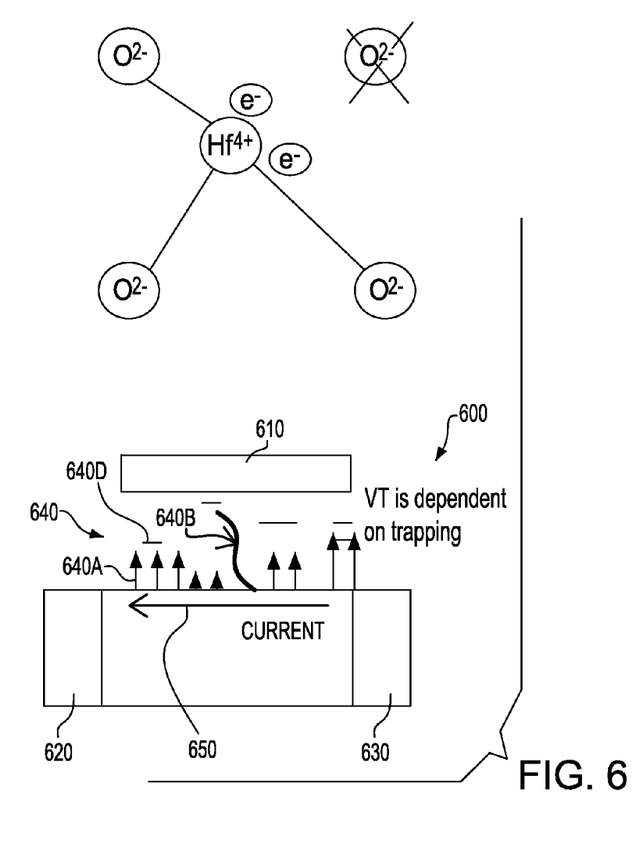
FIG. 6 shows a charge trap memory cell.

Referring to FIG. 6, a basic charge trap used on an embodiment is illustrated. A charge trap can be observed in a high performance logic NMOS. The NMOS has an initial threshold voltage of $VT_0$. NMOS $VT_0$ that can be increased to VT by trapping a number of electrons (e−) to the vacancy of oxygen ($O_2$) in the dielectric (640) of NMOS (600). The vacant oxygen point (640D) in $Hf_4$ oxide (640) traps electrons (640A) in condition of applying a high voltage to the gate (610) while applying a high voltage between the source (620) and the drain (630) such that the NMOS strongly turns on to flow a large current through the channel (650). The trapped charges (e−) increase the NMOS threshold voltage to $VT_1$ ($=VT_0+\Delta VT$). Moreover, the trapped electrons (e−) (540B) can be eliminated by applying a negative voltage between the gate (510) and the source (520), recovering the $VT_0$ condition.

Figure 7:
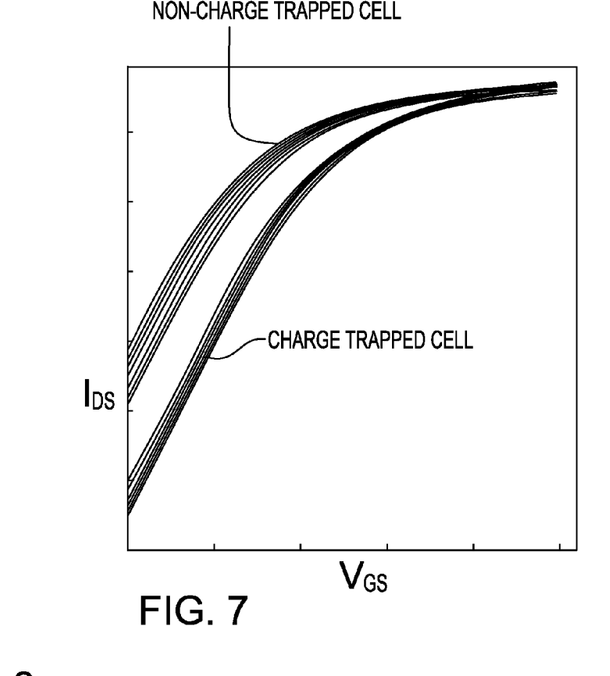
FIG. 7 illustrates a measured source-to-drain current (IDS) with respect to the gate-to-source voltage of an NMOS transistor.

Referring to FIG. 7, the measured drain of source to current (IDS) with respect to the gate to source voltage (VGS) of the $Hf_4$ NMOS transistor (600) is illustrated in FIG. 6. IDS can be measured while trapping and detrapping the charge several times. As expected, trapping electrons increases the NMOS threshold, resulting in a smaller current than without trapping. The $VT_1$ of the charge trapped NMOS can be successfully reset to $VT_0$ of a non-charge trapped NMOS.

Figure 8:
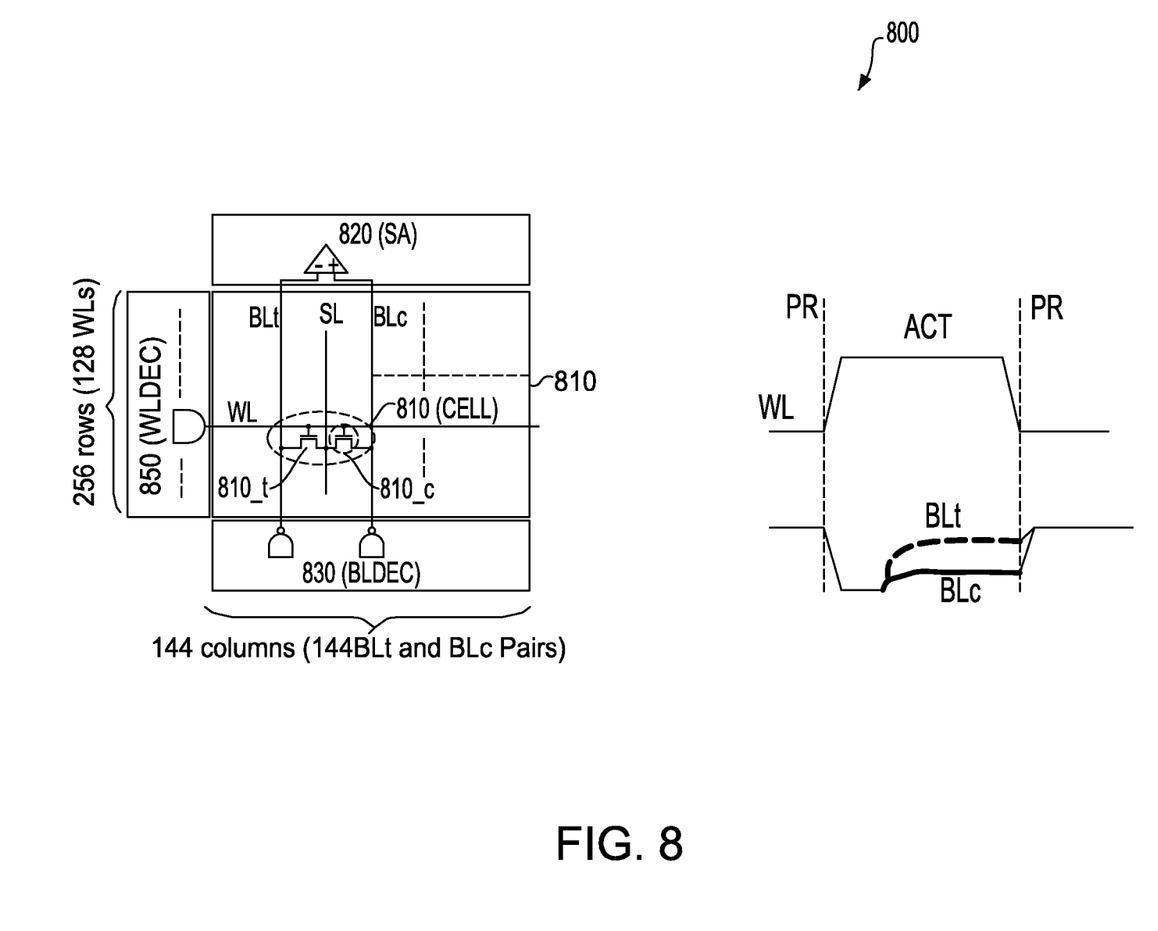
FIG. 8 illustrates a 144 Kb array consisting of 144K memory cells, each having two NMOS arranged in 128 rows by 144 columns.

A third preferred embodiment uses the charge trap believer in the array (101) or array (301) referred to in the first and second preferred embodiments to enable a more stable PUF generation using error-correction bits with an additional voltage control. Referring to FIG. 8, the macro architecture (800) is shown for a stable PUF generation consisting of the NOR-type NMOS array (810), a wordline decoder block (850: WLDEC), a bitline decoder block (830: BLDEC) and a sense amplifier block (820 SA). In another embodiment, the NOR-type NMOS array (810) can include a plurality of memory cells, each having a true bit of NMOS and a complement bit of NMOS for a 144 Kb density. More specifically, 144 Kb array consists of 144K memory cells (810), each having two NMOS (810_t and 810_c) arranged in 256 rows coupled to 256 wordlines (WLs) and 144 columns coupled to 144 bitline true (BLt) and bitline complement (BLc) pairs in a two dimensional matrix. The drains of the twin NMOS are coupled to the Source-Line (SL). The BLs are precharged at the voltage source (VDD=1V) in standby state. The SLs in the entire array are precharged at the voltage source (VDD=1V) in a standby and random bit generation.

Figure 9:
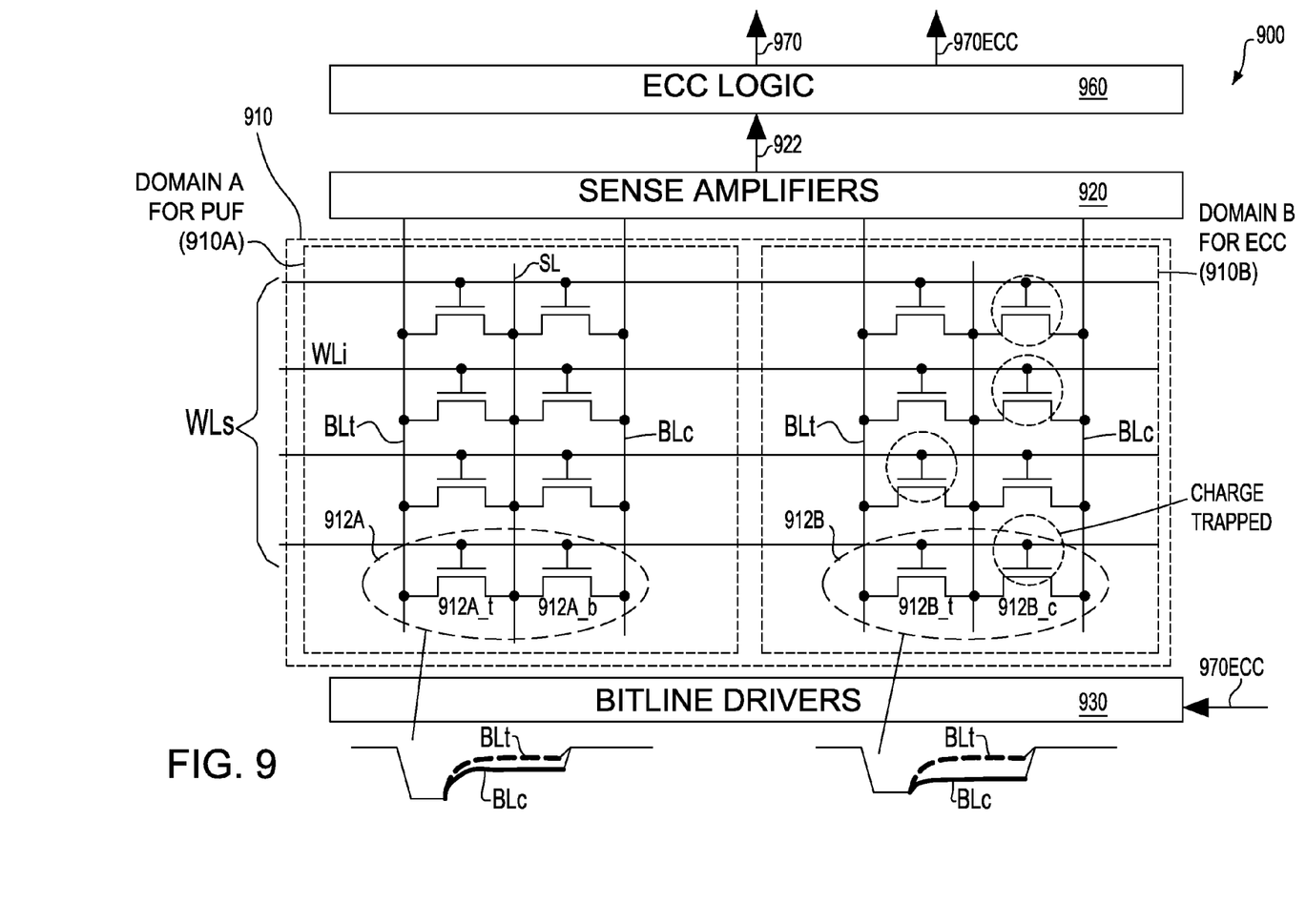
FIG. 9 illustrates a 144 Kb array consisting of 144K memory cells each having two NMOS arranged in 128 rows by 144 columns, and where domain A and domain B are assigned for PUF bits and error correction bits, respectively.

FIG. 9 shows a schematic of a Stable PUF generation memory MACRO (SPUFMACRO). SPUFMACRO (900) is configured in two domains A and B in the memory array (910), wherein the memory cells in domains A (910A) and B (910B) are used for the physical unclonable fuse (PUF) bit generation, and the error-correction-code (ECC), respectively. More specifically, the memory cells (912A) in domain A (910A) do not trap a charge in neither NMOS (912A_t and 912A_c). The memory cells (912B) in domain B (910B) traps the charge in either the NMOS (912B_t and 912B_c) to program the error correction code (ECC) bits, in a programming method to be referred hereinafter.

When a random bit generation is to be enabled, one out of 256 WLs is activated by wordline decoder block (not shown). This results in selecting 144 columns coupled to the activated WL (WLi), wherein 128 bits are used for random bit generation, and 16 bits are for the ECC bits for correcting the generated 128 bits. BLt and BLc are then discharged to GND by the bitline driver block (930). The discharge operation stops after a few nanoseconds, floating the BLt and BLc. Thus, BLt and BLc are naturally precharged through the selected NMOS pair (912A and 912B) coupling to the activated WL (WLi). As BLt and BLc go high because of the source follower mode of the NMOS device operation (912A and 912B), the gate overdrive to WL to BLt and to BLc is reduced, eventually disables NMOS, as shown in the corresponding timing diagram. This results when generating VDD minus NMOS device threshold voltage (VT) on each BLt and BLc. Because the intrinsic distribution of the NMOS VTs in un-programmed memory cells (912A) in domain A, a differential voltage between the BLt and BLc depends on the column. The BL voltage is thus converted to a random digital bit pattern (922) by sense amplifiers (920). In the random bit pattern generation, some of the bits are not stable if the generated BL differential voltage is small. To overcome this problem, generated bits (922) are coupled to the ECC logic (960), generating ECC bits (970 ECC). In the present example, 16 ECC bits are prepared to correct one out of 128 PUF bits. However, a correction bit can be increased for repairing a significantly more powerful correction, which is known in the art and therefore will not be referred to in the application.

For programming the corresponding ECC bits, WL is raised to an elevated wordline voltage (EWLH=2V). Prior to the WL activation, BLs and SL in the entire array are raised to an elevated bitline voltage (EBLH=1.5V). The bitline decoder block (930: BLDEC), and then selects 16 columns in domain B such that either BLt or BLc in each sECC column is discharged to ground (GND). This results in a large current flow to trap the charge for the corresponding selected either NMOS (912B_t) or NMOS (912B_c). When NMOS (912B_t) is selected, the VT of the NMOS (912N_t) is increased by ΔVT, resulting in a '1' write. When NMOS (912B_c) is selected, VT of NMOS (912_c) is increased by ΔVT, resulting in a '0' write. The written bits to the ECC are determined by the ECC bits (924) generated by the ECC logic (960). The BLs (912A_t and 912A_c) remain at EBLH of 1.5V, resulting in no current flowing though the memory cells (912A) in domain A. Therefore, the intrinsic random VT in the NMOS (912A and 912B) is kept for PUF bit generation.

Following the programming of the ECC bits in the memory cells (912B) in domain B, the differential bitline voltage on the columns in the domain B is sufficiently large, generating stable ECC bits. This results in one out of 128 bits correction during the random PUF bit generation using 16 ECC bits.

Because of the charge trap based ECC bit programming, the ECC bits can be reset. The remaining operation is enabled by lowering WLs in the entire array to a negative wordline voltage (NWLL=−1V), while keeping BL and SL precharged at 1V. This results in applying a negative gate-to-source voltage (VGS=−2V) of all the NMOSs in the array 910). The trapped charge is detrapped, recovering the initial VT of the entire memory cells (912B).

Figure 10:
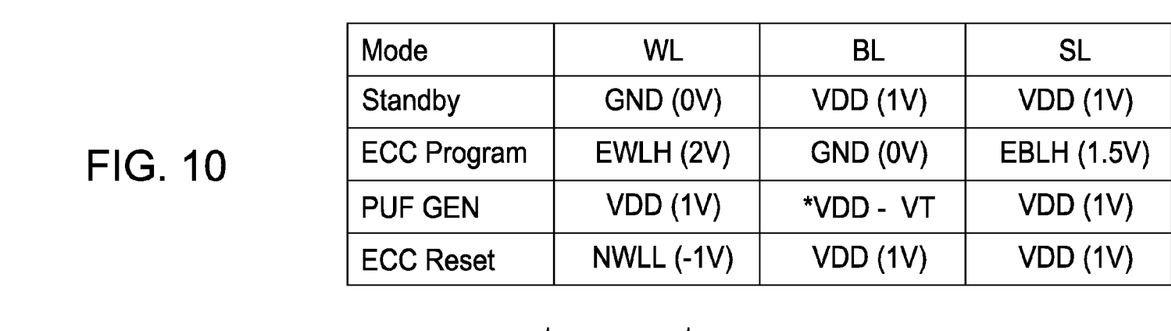
FIG. 10 shows voltage conditions for programming, and resetting the memory cells.
Figure 11:
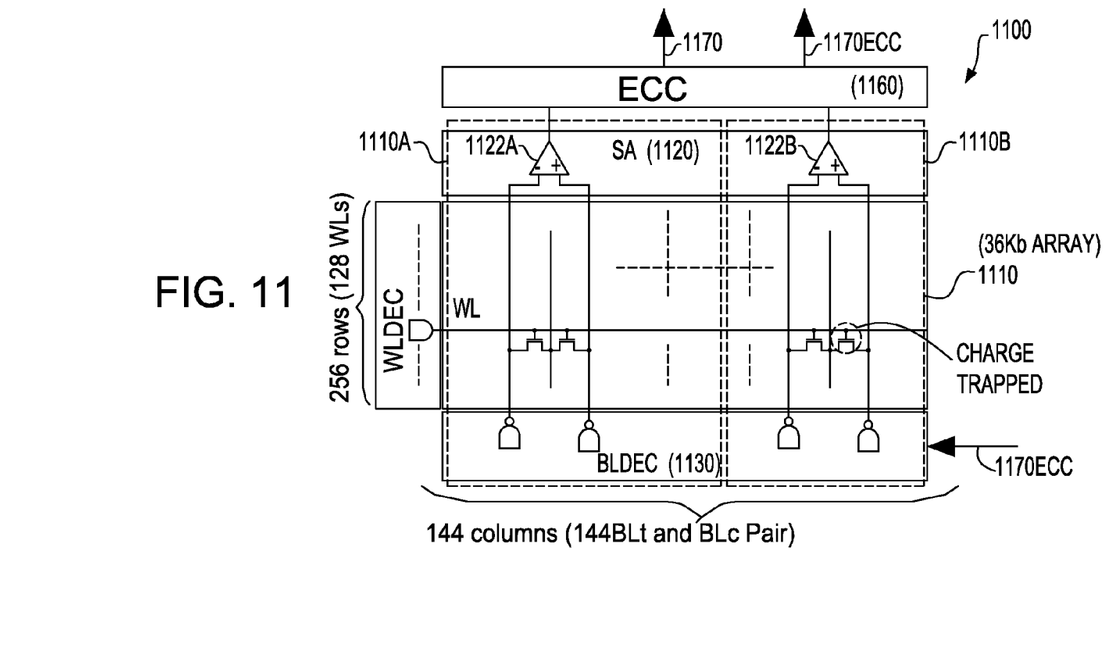
FIG. 11 shows the detailed of 144 Kb memory array seen in FIG. 9.

FIG. 10 summarizes the voltage condition for a standby ECC programming, PUF generation (random bit pattern generation), and ECC reset mode. FIG. 11 shows the overall macro (1100) having a 144 Kb array (1110), domain A (1110A) for PUF generation, and domain B (1110B) for ECC bit generation. Both are supported by the wordline decoder (WLDEC) to select one out of 256 WLs selection in a random bit generation, as well as ECC bit programming. They are also supported by the bitline decoder (1130), sense amplifier block (SA 1120), and ECC logic (1160). As shown, the memory cell in domain A (1110A) does not trap the charge, generating a random pattern output as a PUF from the SA (1122A). The unstable generated PUF is corrected by the stable ECC bit output from SA (1122B) coupled to the memory cells having either a true or a complement NMOS traps the charge to store the ECC bit. This results in a stable random bit string (1170) as an output vector of the ECC logic (1160).

Figure 12:
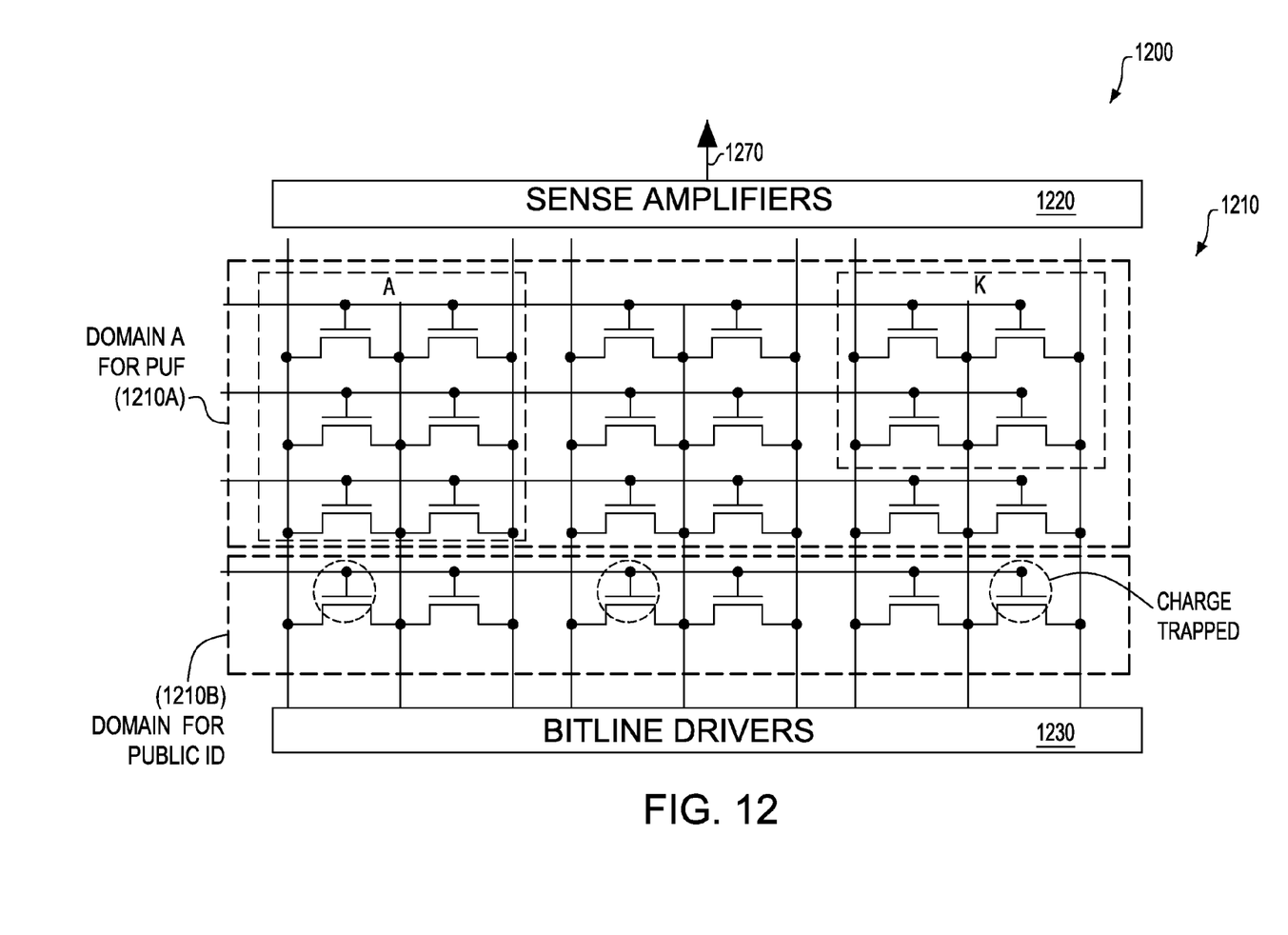
FIG. 12 shows a schematic diagram of the memory array, wherein the memory cells in domain A are assigned for a PUF generation with non-programmed cells with the memory cells in domain B being assigned to a non-volatile public ID with programmed cells.

The charge trap based PUF generation macro can incorporate a public ID within the array which allows a secret challenge approach for authentication. In a fourth preferred embodiment, while still referring to FIG. 11, the charge trap PUF generation macro (1200) consists of a charge trapped memory array (1210) having two domains, wherein the memory cell in domains (1210A) and (1210B) are used for PUF bit generation, and public ID, respectively. The domain A further consists of a plurality of sub-domains (i.e., A, K). The size of the domain can be variable. As referred previously, intrinsic random bits are generated by reading from the memory cells in the domain (1210A), each having two transistors (t and c) without trapping a charged trap. This results in a random bit generation as a PUF because of the intrinsic VT variation of the two transistors (t and c) of each cell. Public ID is programmed to identify the chip by trapping a charge to either one of the two transistors of each cell in the domain (1210B) using the charge-trap referred previously for the ECC bit programming. Macro (1200) can include ECC Cbit for generating a stable PUF, as referred to in the previous preferred embodiment.

Figure 13:
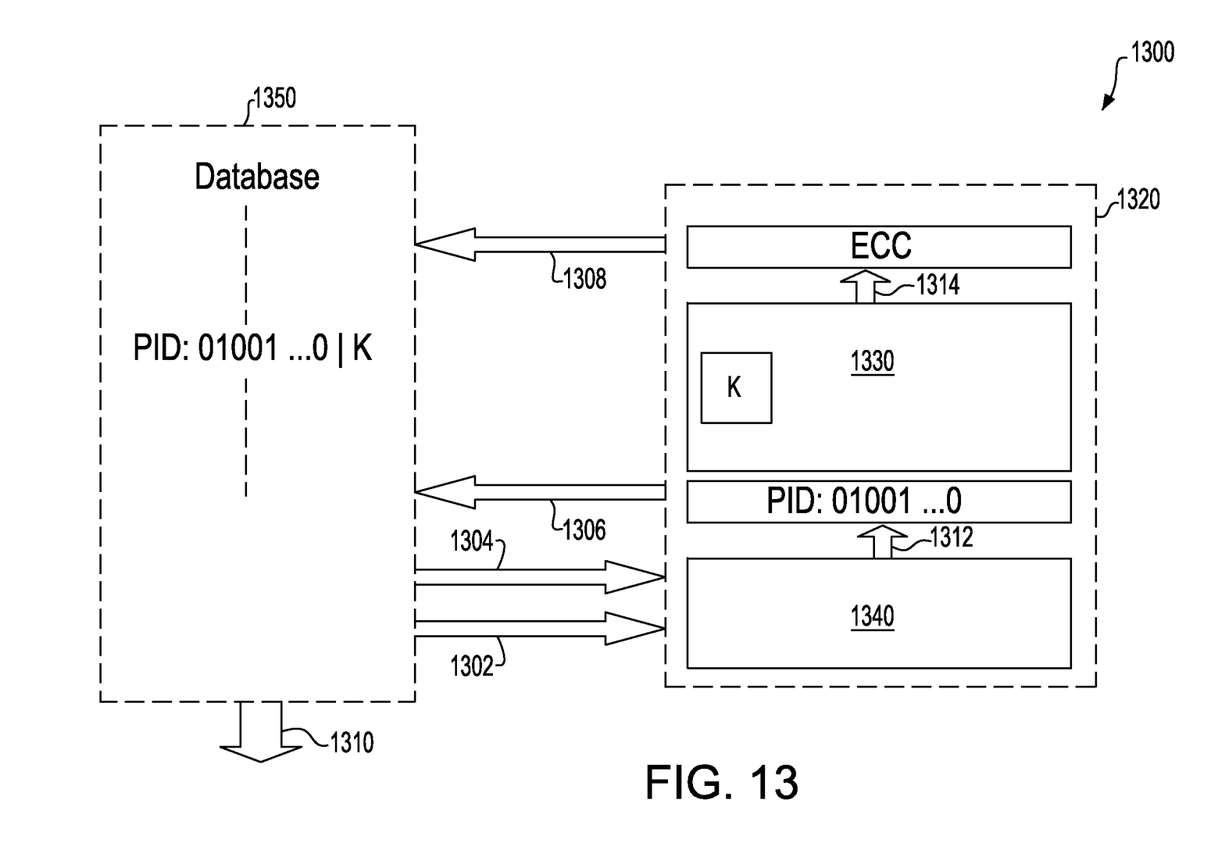
FIG. 13 shows a handshake authentication method using a NOR type memory array with public ID and PUF ID, wherein the challenge to the chip is unique to each corresponding chip, dynamically changing at each authentication to improve the HW security.

Referring to FIG. 13, a high security authentication is enabled by a handshaking method using public ID and intrinsic ID binary bits between the computer and the chip. More specifically, the high security system (1300) consists of computer (1350) and the chip including a charge-trap based PUF generation ID macro (1320). The computer (1350) includes a database which records the public chip ID (PID), and the corresponding intrinsic ID binary strings (IID) as PUF. PID (01001 . . . 0) and IID (K) are stored in secure enjoinment when the chip is registered. The IID of K includes the selected sub-domain (K) used for IID PUF generation.

In order to authenticate the chip, the computer (1350) requests a PID read (1302) to the chip (1320). The control circuit (1340) in the chip requests to read the PID from the macro array (1330) by control command 1312. This results in generating a PID (1306 i.e. 01001 . . . 0). PID is then sent to the computer (1350). The database in the computer (1350) searches the chip having the PID. The computer (1350) then requests an Intrinsic ID (IID) generation (1304) for one of the sub-domains (i.e., K) to the chip. On the basis of the sub-domain information, the controller (1340) requests the macro (1330) to generate IID binary strings (1308) in the sub-domain K. The IID binary strings are transferred to the computer (1350). The computer (1350) confirms that the IID binary strings are the same as the data base record, outputting the result (1310) "authenticated when confirmed", or "not authenticated when not confirmed". A unique secret sub-domain is then assigned to each chip, resulting in a secure system. The secret sub-domain can be dynamically changed in each authentication by using a plurality of IID, each corresponding to some sub-domains, which further improves the hardware security.

While the present disclosure has been particularly shown and described with respect to preferred embodiments thereof, it will be understood by those skilled in the art that the foregoing and other changes in forms and details can be made without departing from the spirit and scope of the present disclosure. In one therefore intended that the present disclosure not be limited to the exact forms and details described and illustrated, but fall within the scope of the appended claims.

What is claimed is:

1. A method for providing an unclonable identifying chip comprising:
    forming a memory array consisting of memory cells arranged in a matrix, each of the memory cells having one NMOS transistor, wherein the NMOS transistors in each row are coupled to a wordline, and the NMOS transistors in each column are coupled to a bitline and to a source line, the source line having a voltage (VDD);
    activating the wordline and forcing the bitline to a predetermined voltage, the predetermined voltage being lower than the voltage VDD,
    wherein a threshold voltage of the NMOS transistor of the memory cell is increased by providing the NMOS transistor with a charge trapping in response to applying an elevated wordline voltage to the activated wordline, and providing a voltage higher than the voltage VDD to the source line and forcing a corresponding bitline to ground (GND) during the activation of the wordline;

floating the bitline followed by precharging the bitline through the NMOS transistor coupled to the activated wordline; and sensing the bitline voltage, wherein random binary strings are generated by sensing results of the bitline voltage.

2. The method of claim 1, wherein said sensing is realized by comparing said bitline voltage with a predetermined reference voltage.

3. The method of claim 2, wherein said predetermined reference voltage is provided by said transistor of said memory cell, and having said NMOS gate and drain coupled to said VDD, and said source of said NMOS is first lowered and subsequently floated.

4. A method providing an unclonable identifying chip comprising:

forming a memory array, consisting of memory cells arranged in a matrix, each memory cell having two NMOS transistors, wherein a gate of the NMOS transistors in each row is coupled to a wordline, and a source of a first one of the two NMOS transistors in each column is coupled to a true bitline, and a source of a second one of the two NMOS transistors in each column is coupled to a complement bitline, and a drain of the two NMOS transistors is coupled to a source line having a voltage (VDD);

activating the wordline, and forcing a voltage to the true and the complement bitlines to a predetermined voltage, the predetermined voltage being lower than the voltage VDD, wherein a threshold voltage of at least one of the NMOS transistors of the memory cell is increased by providing the at least one of the NMOS transistors with a charge trapping in response to applying an elevated wordline voltage to the activated wordline, and providing a voltage higher than the voltage VDD to the source line and forcing a corresponding bitline to ground (GND) during the activation of the wordline;

floating the true and the complement bitlines;

precharging the bitline through the NMOS transistor coupled to the activated wordline; and sensing a differential voltage of the true and the complement bitlines, wherein random binary strings are generated by sensing results of the differential bitline voltage.

5. The method of claim 4, wherein said random binary string are generated by said memory cell with two of non-trapped of said NMOS transistors.

6. The method of claim 5, wherein a subset of said memory cells is provided with error-correction-code (ECC) bits for correcting a generated PUF using an ECC logic circuit.

7. The method of claim 6, wherein said error correction bits are programmed by said trapped charge.

* * * * *